UNITED STATES PATENT OFFICE.

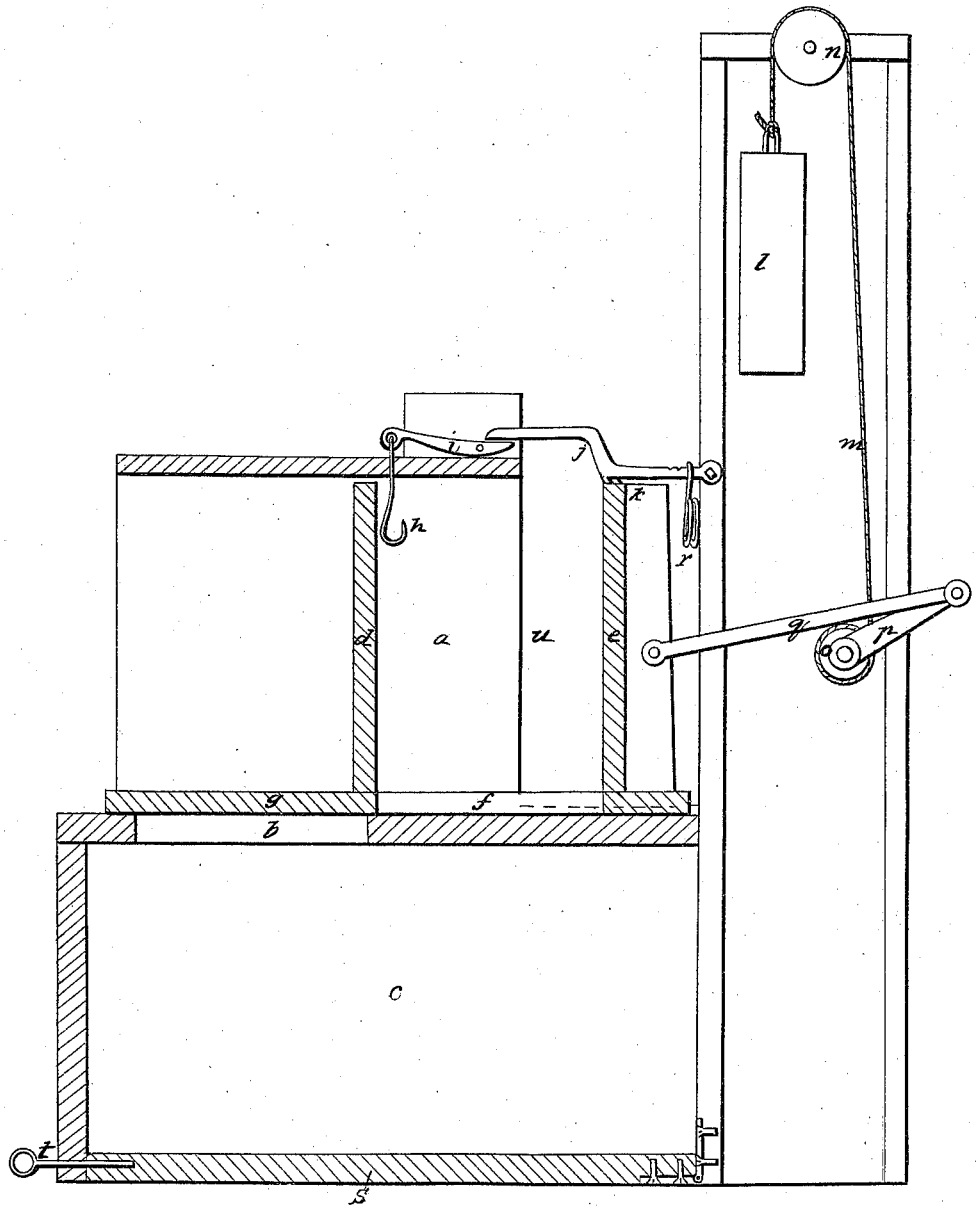

JOSE TOLL, OF LOCUST GROVE, OHIO.

RAT-TRAP.

Specification of Letters Patent No. 10,764, dated April 11, 1854.

*To all whom it may concern:*

Be it known that I, JOSE TOLL, of Locust Grove, Adams county, Ohio, have invented new and useful Improvements in Self-Setting Rat-Traps; and I do hereby declare the following to be a full, clear, and exact description thereof, reference being had to the annexed drawing, making part of this specification.

The object of my improvements, is to provide a rat trap, in which the receiving vestibule or chamber shall exhibit no sign or taint of the rats already caught, and in which the weight of the animal shall act in conjunction with the power applied to remove them into the cell below.

In the accompanying drawings (being a vertical section) ($a$) is the receiving chamber or vestibule, open at the front and back, and closed at the sides and top, and also at the bottom with the exception of an aperture ($b$) through the top of and forming the entrance to the cell ($c$). Two slidable partitions ($d\ e$) united together by cleats ($f$) and affixed to a floor ($g$), occupy when at rest the position shown in the drawing in which it may be seen that the floor ($g$) closes over the entrance to the cell ($c$). Hanging immediately behind the front partition ($d$) of this reciprocating apparatus is the hook ($h$) to hold the bait, which hook is linked at its upper end to a trigger ($i$) whose counter arm being elevated by the pulling downward of the hook, slightly raises the end of the lever ($j$), so as to liberate from the nick on the under side of the lever, the catch ($k$) on the top of the partition ($e$), and permit the partitions ($d\ e$) with the floor ($g$) and cleats ($f$) to move bodily forward; being impelled so to do by the following mechanism. ($l$) is a weight to which is attached a cord ($m$) which passing over a sheave ($n$) is wound around a barrel ($o$), the crank ($p$) on which, connects by rod ($q$) with the partition ($e$) as represented. The winding of the cord is effected by giving the crank ($p$) several turns to the right. By this means, it will be seen, that the crank has a tendency to rotate rapidly to the left, and will move the partitions to and fro, when not restrained by the catch. ($r$) is a spring which holds the lever firmly down upon the catch, and insures the self locking and retention of the catch on the return of the partitions, and thus makes the apparatus self setting time after time, so long as the weight remains suspended.

When it is desired to empty out the rats caught, the bottom ($s$) is let down, by withdrawing the pin ($t$).

The operation is as follows: The weighted cord being wound up and the hook baited: the rat entering by the open end ($u$) and pulling at the baited hook, disengages the catch as before explained, and the partition ($e$) in consequence suddenly moving forward, the rat is imprisoned between the walls of the chamber, and being brought over the aperture ($b$), falls by his own weight into the cell below, and the floor, sliding back to its first position, is held thereto, until again liberated in the same way.

I claim herein as new and desire to secure by Letters Patent—

The combination as described, of reciprocating and self locking partitions and floor ($d\ e\ g$) in connection as described with the weighted crank which on the liberation of the catch alternately opens and closes the entrances of the chamber and of the cell.

In testimony whereof, I hereunto set my hand before two subscribing witnesses.

JOSE TOLL.

Witnesses:
GEO. H. KNIGHT,
J. H. GETZENDANNER.